(12) United States Patent
Bretschneider et al.

(10) Patent No.: US 12,383,999 B2
(45) Date of Patent: Aug. 12, 2025

(54) OPERATING FACILITY FOR A CNC CONTROL SYSTEM FOR CONTROLLING A MACHINE TOOL WITH A ROTARY CONTROLLER

(71) Applicant: Siemens Aktiengesellschaft, Munich (DE)

(72) Inventors: Jochen Bretschneider, Owingen (DE); Matthias Bauschert, Daaden (DE)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 17/890,594

(22) Filed: Aug. 18, 2022

(65) Prior Publication Data

US 2023/0057688 A1    Feb. 23, 2023

(30) Foreign Application Priority Data

Aug. 20, 2021   (EP) ..................................... 21192416

(51) Int. Cl.
   *B23Q 15/12*    (2006.01)
(52) U.S. Cl.
   CPC .................................... *B23Q 15/12* (2013.01)
(58) Field of Classification Search
   CPC ...................................................... B23Q 15/12
   USPC ....................................................... 700/180
   See application file for complete search history.

(56) References Cited

U.S. PATENT DOCUMENTS

| | | | |
|---|---|---|---|
| 9,627,160 B1 | 4/2017 | Rojko et al. | |
| 2008/0234855 A1 | 9/2008 | Haas et al. | |
| 2013/0041497 A1* | 2/2013 | Schon | G01B 21/047 700/186 |
| 2017/0160722 A1* | 6/2017 | Kawai | G05B 19/409 |
| 2019/0250581 A1 | 8/2019 | Hackl et al. | |

FOREIGN PATENT DOCUMENTS

| | | |
|---|---|---|
| CN | 201699814 U | 1/2011 |
| CN | 103299132 A | 9/2013 |
| CN | 107068507 A | 8/2017 |
| CN | 110948286 A | 4/2020 |
| DE | 202004021347 U1 | 6/2007 |
| DE | 102006052653 A1 | 5/2008 |
| EP | 3 130 973 A1 | 2/2017 |
| JP | S62231315 A | 10/1987 |
| JP | 2004102491 A | 4/2004 |

(Continued)

OTHER PUBLICATIONS

Xu Mingzhe: "Electronic Components and Materials", DOI: 10. 14106 /j. enkl. 1001-2028. Feb. 10-Apr. 28, 1985.

*Primary Examiner* — Jigneshkumar C Patel
(74) *Attorney, Agent, or Firm* — Henry M. Feiereisen LLC

(57) ABSTRACT

An operating facility for a CNC control system controls a machine tool with a plurality of machine axes. A tool inserted into a tool receptacle of a tool spindle can be displaced relative to a workpiece and/or rotated about a tool spindle axis. A rotary controller manually operated by an operator can set a feed rate with which the tool is moved relative to the workpiece and/or a spindle rotary speed. A graphical user interface is used to adjust the effect of an operating action carried out by the rotary controller on the feed rate or the spindle rotary speed. This improves the flexibility with regard to adaptation to the requirements of the individual user.

13 Claims, 6 Drawing Sheets

(56) References Cited

FOREIGN PATENT DOCUMENTS

| JP | 2010256463 A | 11/2010 |
| JP | 2011114466 A | 6/2011 |
| WO | WO 2018/049450 A2 | 3/2018 |
| WO | WO 2019/023727 A2 | 2/2019 |

* cited by examiner

FIG 9

![Figure 9 - dialog 40]

Relates to:
G0 ☑   Gn ☑   G ☐

Setting of characteristic line | Setting of rotation range
☑ | 0 — 270° ☐
☐ | 0 — 360° ☑
☐ | 0 — 720° ☐

FIG 10

![Figure 10 - dialog 41]

G0 ☑   Gn ☑   G ☐

Meaning of "rapid rotation left"     Jump by
                                    ☐      ☑      ☐
                                   10 %   20 %   -10 %

Meaning of "rapid rotation right"    Jump to
                                          ☐              ☑
                                         50 %          100 %

Meaning of "right left right"        Switch over
                                          ☑              ☐
                                 Characteristic line 1  Characteristic line 2

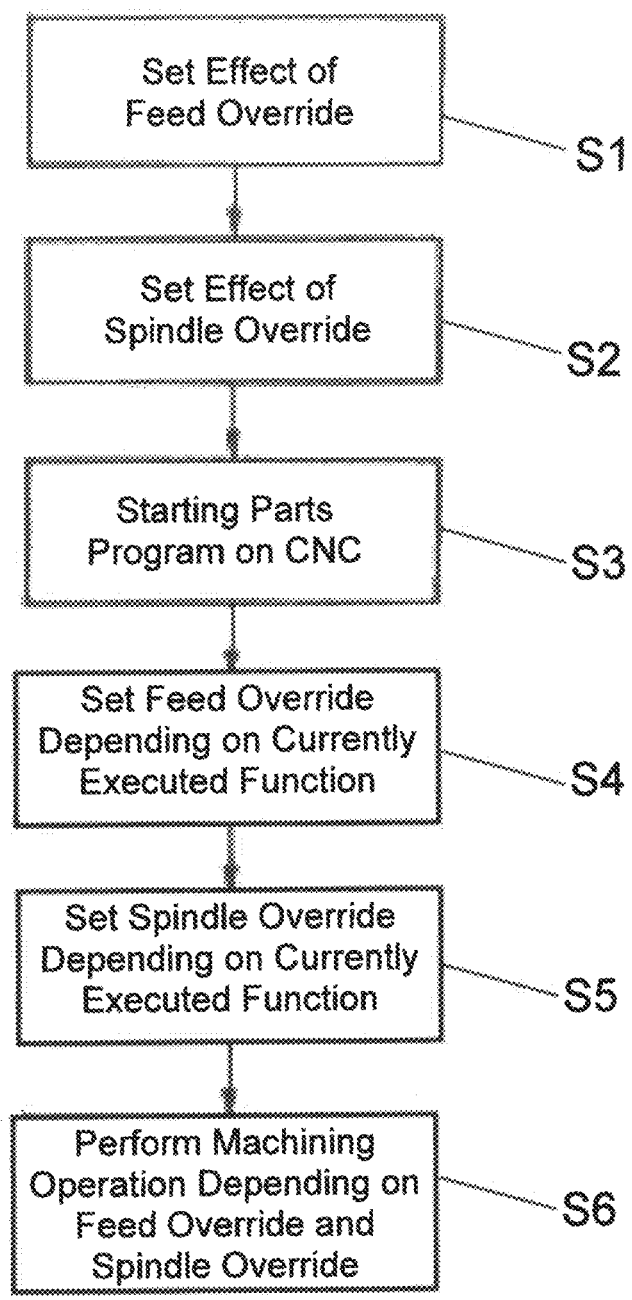

OPERATING FACILITY FOR A CNC CONTROL SYSTEM FOR CONTROLLING A MACHINE TOOL WITH A ROTARY CONTROLLER

CROSS-REFERENCES TO RELATED APPLICATIONS

This application claims the priority of European Patent Application, Serial No. 21192416.2, filed Aug. 20, 2021, pursuant to 35 U.S.C. 119(a)-(d), the content of which is incorporated herein by reference in its entirety as if fully set forth herein.

BACKGROUND OF THE INVENTION

The present invention relates to an operating facility for a CNC control system for controlling a machine tool, and to a method for operating a machine tool controlled by a CNC control system which includes an operating facility.

The following discussion of related art is provided to assist the reader in *understanding the advantages of the invention, and is not to be construed as an admission that this related art is prior art to this invention.

Machine tools are controlled nowadays with the aid of a control facility such as for example a CNC control system. Therein, using a parts program, the control facility "controls" the movements of machine elements and therewith the movements of a tool which is introduced, for example, via a tool holder apparatus into the machine, relative to a workpiece which is also introduced into the machine. It is therein clear to a person skilled in the art that the expression "control" relates to common linguistic usage and not "control" in the sense of control engineering. Herein "control" means primarily the specification of position setpoints for positional control of axes, behind which lie control processes within the meaning of control engineering.

The parts program is therein primarily composed of control commands which are read in and interpreted by the control facility. According to the control commands, the control facility controls the movements of the machine elements of the machine tool and thereby the movement of the tool relative to the workpiece.

The parts program can, in principle, be generated manually on an editor directly at the machine or on an external computer.

In order to create a parts program, typically movement information regarding movements that are to be performed by the tool is generated by a CAM (computer aided manufacturing) system, preferably in a standardized data format and is read in by a downstream postprocessor. On the basis of the movement information generated by the CAM system, the kinematic and machine data of the machine tool and the command set of the CNC control system and the command set of the PLC control system, the postprocessor generates a parts program in the form of control commands adapted to the specific control facility of the machine tool for the respective specific machine tool on which the machining process is to take place. In such a way, the movement information generated by the CAM system, preferably in a standardized data format, is converted into control commands which can be read in by the control facility and is adapted to the respective control facility by the postprocessor.

The postprocessor therein takes account, apart from the specifically available CNC command set, of the particular machine-specific kinematic circumstances of the machine tool, such as, for example, kinematics, geometric size details, maximum travel ranges of the drive axes and maximum speeds of the machine elements. This data is available in the form of machine data. In addition, during the creation of the control commands, machine-specific PLC (programmable logic control) functionalities such as, for example, lubrication, tool changing, door locking, etc. are taken into account by the postprocessor, wherein the specifically available PLC functionalities are available to the postprocessor in the form of PLC command sets.

The operation of machine tools takes place via operating facilities such as an HMI (human machine interface) of the CNC control system, a machine control panel (MCP) that can be connected to the CNC control system, or by means of manual operating devices. Operating facilities for machine tools have at least one, but often a plurality of, override (OVR) control elements (hereinafter also referred to, for short, as "override") to influence the manipulated variables of feed rate (for short, "feed") of the feed axes or the rotary speed of the main spindle.

For the feed, a distinction can also be made between a machining feed in which the tool is in engagement with the workpiece, and a rapid feed in which the tool is not in engagement.

Known operating facilities for CNC control systems have a single feed override with which both the machining feed (the feed rate for a case in which the tool is in engagement with the workpiece) and also the rapid feed (the feed rate or rapid feed rate for a case in which the tool is not in engagement with the workpiece) can be set separately from one another, depending thereon which case currently exists during an actuation of the feed override. However, operating facilities are also known which use separate feed overrides for the machining feed and the rapid feed.

The manipulated variable is usually not set absolutely by the control element (e.g. the spindle speed directly in rpm), but rather is changed as a percentage in relation to a programmed value, e.g. in a value range from 0% to 120% of the programmed value.

Typically, override controllers are nowadays designed as rotary controllers with fixed stops that can be set by means of a rotary knob in a particular angular range, e.g. between 0° and 270° by manual actuation of a rotary knob. However, override controllers in the form of endlessly rotatable rotary controllers (incremental encoders) are also known.

Rotary controllers should not be understood in relation to the invention as only "pure" rotary controllers which exclusively permit the manual actuation of a rotary knob, but rather also as operating elements which apart from the rotary knob, additionally comprise a pushbutton switch (also referred to as a turn and press controller) or the function of a joystick, etc.

The value of the manipulated variable often does not change linearly with the override setting (that is, the rotation angle of the rotary knob), but in discrete steps. Thus, for example, in the case of a spindle override (also designated SPINDLE-OVR), 16 different angular ranges of a rotary controller are assigned to one spindle speed. This occurs, for example, for settings of between 50% and 120% evenly divided into 5% steps.

It should be noted that the expression "rotation angle" can be understood as both the absolute angle that the rotary controller currently assumes (e.g. 0° or 180°) or the angular range that is swept out given a particular operating action (e.g. 20°, given a change from 180° to 200°). The respective meaning results from the context.

In the case of a feed override (also designated FEED-OVR), for example, the angular range of the rotary controller is assigned from 0° to 270° in 23 "switch positions", i.e. angular ranges of approximately 12° each (supposing a non-linear, stepped characteristic line) of the percentage feed influence as follows:

Angular range 1=0%
Angular range 2=1%
Angular range 3=2%
Angular range 4=4%
Angular range 5=6%
Angular range 6=8%
Angular range 7=10%
Thereafter (angular ranges 8 to 23) in 10% steps to 120%

The non-linear distribution in the case of the feed override permits the user a finer gradation in the low-speed range and is due to the finite number of rotary switch positions which, given a linear distribution of the percentage changes would lead to "large jumps" in the low-speed range.

In particular with digital incremental encoders, however, substantially finer gradations and thus characteristic lines that appear "stepless" to the user can be achieved.

Strictly speaking, in machine tools the feed rate is understood to be the speed at which the tool is moved relative to the workpiece "through the workpiece" for machining the workpiece and the tool is therefore "in engagement". By means of the feed override, however, as a rule movements of the machine axes wherein the tool is not in engagement, e.g. so-called rapid feed movements, are similarly also influenced. In the context of these patent applications, with the expressions feed override or feed rate, such movements are also explicitly included in which the tool is not in engagement, for example, rapid feed movements.

A disadvantage of existing rotary controllers for influencing the feed rate or the spindle rotary speed of machine tools is their lack of flexibility with regard to adaptation to the requirements of the individual user.

It would therefore be desirable and advantageous to address prior art shortcomings and to improve flexibility with regard to adaptation to the requirements of the individual user where rotary controllers are used for influencing the feed rate or the spindle rotary speed of machine tools.

SUMMARY OF THE INVENTION

According to one aspect of the present invention, an operating facility for a CNC control system for controlling a machine tool which has a plurality of machine axes configured to displace or rotate a tool inserted into a tool receptacle of a tool spindle relative to a workpiece, includes at least one endlessly rotatable rotary controller which can be manually operated by an operator of the operating facility by rotating a rotary knob of the rotary controller and which is configured to manually set by the operator a feed rate with which the tool is moved relative to the workpiece or a rotary speed of the tool spindle, and a graphical user interface configured to adjust an effect of an operating action on the feed rate or the spindle rotary speed carried out by the operator using the rotary controller.

According to another aspect of the invention, a method for operating a machine tool, which has a plurality of machine axes configured to displace or rotate a tool inserted into a tool receptacle of a tool spindle relative to a workpiece controlled by a CNC control system and which further comprises an operating facility, includes manually operating by an operator of the operating facility at least one endlessly rotatable rotary controller configured to manually set by the operator by rotating a rotary knob of the rotary controller a feed rate with which the tool is moved relative to the workpiece and/or a spindle rotary speed, setting on a graphical user interface of the operating facility an effect of an operating action on the feed rate or the spindle rotary speed carried out by the operator using the rotary controller, starting on the CNC control system a program specifying the movement of the tool relative to the workpiece, and changing the feed rate or the spindle rotary speed according to the operating action.

According to yet another aspect of the invention, a CNC control system for controlling a machine tool includes the aforedescribed operating facility.

The invention offers the advantage that the operator can set the effect of an operating action carried out by means of the rotary controller on the feed rate and/or the spindle rotary speed individually according to his requirements and preferences. In particular, it has been found that for different workpiece machining operations carried out with the machine tool, different effects of a particular operating action are optimal. For example, for a particular machining operation, the value range between 0% and 20% of the speed or rotary speed set by means of the OVR can be decisive, whereas this value range plays only a subordinate role for another machining operation. In the first case, a relatively large angular range of the rotary controller can be assigned to the value range in question, so that in this range a good "fine setting" can be ensured. In total, more flexibility in the use of the override adjusters is achieved through the invention.

According to another advantageous feature of the invention, when actuating the rotary controller, a rotary angle can be set and for setting the effect of the operating action, a relationship between the rotation angle and a percentage set value (hereinafter designated the "OVR value") can be specified, wherein the percentage set value determines a relationship between a programmed feed rate and/or a programmed spindle rotary speed and an actual feed rate and/or an actual spindle rotary speed.

Similarly, according to an advantageous feature of a method of the invention, when actuating the rotary controller, a rotary angle of the rotary knob can be set, wherein for setting the effect of the operating action, a relationship between the rotation angle and a percentage set value is specified, wherein by means of the percentage set value, a relationship between a programmed feed rate and/or a programmed spindle rotary speed and an actual feed rate and/or an actual spindle rotary speed is determined.

When, for example, the programmed value of the spindle rotary speed is 1000 rpm and the percentage set value of the rotary controller is 120%, then an actual spindle rotary speed of 1000 rpm×120/100=1200 rpm results.

The invention permits a long-known "classic" mode of operation of a conventionally used rotary controller to be emulated. Thus, the rotary controller can be "programmed" such that in an angular range of between 0° and 270°, it implements 16 or 23 steps and for a rotation angle <0° the smallest percentage set value (0%), and for rotation angles >270°, the largest percentage set value (120%) is maintained.

Thus, if needed (for particular applications) the behavior of a known rotary controller with which the operator is familiar can be emulated.

Furthermore, the invention enables an almost arbitrary relationship between the rotation angle and the percentage set value to be specified (or "programmed"). In particular, in this way, an at least approximately "smooth" (continuous) characteristic line can be specified.

According to another advantageous feature of the invention, by way of at least one predetermined operating action, a predetermined operating function can be executed and a relationship between the operating function and the percentage set value can be specified.

Similarly, according to another advantageous feature of a method of the invention, by way of at least one predetermined operating action, in particular an operating sequence, a predetermined operating function can be executed, wherein a relationship between the operating function and the percentage set value is specified.

An operating action can include a single action, for example, a single short rapid clockwise rotation of the rotary knob of the rotary controller. An operating action can however also comprise a plurality of actions, in particular carried out at a short temporal spacing one after the other, a so-called operating sequence. An operating sequence can also comprise, apart from the—in particular repeated—actuation of the rotary knob, an actuation of at least one further operating element, e.g. the pressing of a button.

According to another advantageous feature of the invention, an operating sequence can be carried out, wherein a relationship between the operating sequence and the OVR value or the feed rate or the spindle rotary speed can be specified.

An operating sequence should be understood herein to be a particular, predefined distinctive action which is triggered, in particular, by way of multiple actuation of the rotary knob of the rotary controller within a particular period.

Examples of operating actions or operating sequences are:
single, rapid, brief ("sudden") clockwise rotation of the rotary controller;
single, rapid, brief ("sudden") anticlockwise rotation of the rotary controller;
single, rapid, brief ("sudden") clockwise rotation of the rotary controller and immediately thereafter, single, rapid, brief ("sudden") anticlockwise rotation of the rotary controller.

The definition and use of operating actions and/or operating sequences has the advantage that thereby an interruption of the fixed relationship between the setting angle of the rotary controller and the OVR value set therewith is possible. For example, by way of short rapid rotation in a particular direction, jumps in the OVR value can be triggered. The rotary controller therefore does not have to be turned by the corresponding angular range in order to reach the "target value".

According to another advantageous feature of the invention, in a selection menu, a number of characteristic lines can be specified from which one can be selected by the operator, wherein the selected characteristic line determines the relationship between the setting angle of the rotary controller and the percentage set value.

Similarly, according to another advantageous feature of a method of the invention, in a selection menu, a number of characteristic lines can be specified from which one can be selected by the operator, wherein the selected characteristic line determines the relationship between the rotation angle and the percentage set value.

For many applications, a particular characteristic line can be particularly favorable, for example a characteristic line which enables a "fine" setting in the lower angular range of the rotary controller or a characteristic line which enables a "fine" setting in the upper angular range of the rotary controller. Thus, a good adaptation to the specific requirement of the user can be easily and quickly enabled for him without himself having to define a suitable characteristic line therefor.

According to another advantageous feature of the invention, the characteristic line can be configured individually, in particular using graphical aids. An individual configuration enables the greatest possible optimization for the specific application of the respective user. A setting by means of graphical aids is also very user-friendly.

Similarly, according to another advantageous feature of a method of the invention, a characteristic line can be specified which determines the relationship between the rotation angle and the percentage set value. Therein, the characteristic line is individually configured according to a preferred embodiment, in particular by means of graphical aids.

The graphical aids can comprise, for example, a display screen and a pointer device as input means. Thus, the characteristic line can be selected, for example, at a particular point with a mouse pointer and in this region can be pulled onto the display screen, wherein advantageously with this action a "smooth" (closed) shape of the characteristic line is retained. Similar functions are well known from drawing programs.

According to another advantageous feature of the invention, the characteristic line can have an at least partially smooth and/or at least partially stepped shape. The possibility of the stepped course enables the setting of characteristic lines which correspond to the previous custom of the user. A smooth (at least largely "stepless") shape prevents jumps and therefore enables a finer setting.

Apart from the setting of the characteristic line by way of graphical aids, other possibilities also exist. For example, the course of the characteristic line could also be determined by way of a mathematical term wherein the shape can be amended by specifying parameters, to mention just one of many further possibilities.

According to another advantageous feature of the invention, when a rotary controller is used, the characteristic line can cover a rotation angle range of greater than 360° and/or negative rotation angles, wherein with negative rotation angles, in particular the rotation direction of the spindle or the movement direction of the tool reverses relative to positive rotation angles (for feed, this means "backward travel").

Similarly, according to another advantageous feature of a method of the invention, the characteristic line can cover a rotation angle range of greater than 360° and/or negative rotation angles, wherein negative rotation angles are assigned to negative percentage set values and wherein for negative rotation angles, the rotation direction of the spindle or the movement direction of the tool reverses relative to positive rotation angles.

A rotation angle range of greater than 360° which permits the assignment of different OVR values to an angular range of the rotary controller of more than 360°, in particular a multiple of 360°, permits a more exact adjustment of the OVR value, which is particularly advantageous for particular applications. For example, the value range of the OVR value of 0% to 120% can be mapped onto two complete rotations of the rotary controller, that is onto an angular range of 720°.

Thus, for example, in the case of a rotary controller with 256 steps (increments or "inc") on an extension of the rotation angle range to 10 full rotations, the resolution of the speed change is altered by a factor of 10 relative to a conventional override controller with just one possible rotation. The resolution of the OVR value is then only approximately 0.05%/inc, as per:

$$\Delta OVR=120\%/(256*10)\text{inc}=0.0469\%/\text{inc}.$$

When the typical machining speed of the axis that can be influenced via OVR, is for example 10 m/min, a resolution of the speed $\Delta v$ is possible as per:

$$\Delta v=10 \text{ m/min}/(256*10)\text{inc}=1/256 \text{ m/min/inc}.$$

Therewith, a very fine setting of the current feed rate or the spindle rotary speed is possible and is needed, for example, for the operator to suppress chatter vibrations by way of highly precise variations of specifically the feed or the spindle rotary speed.

Furthermore, the possibility of a rapid and simple rotation or feed direction reversal can be helpful and advantageous in many applications. Thus, for example, a tool can be removed easily and rapidly from the workpiece, contrary to the feed direction. This is the case, in particular if negative OVR values (e.g. −5%) are assigned to negative rotation angles (e.g. −20° or beginning at 0°, leftward rotation by 20°).

According to another advantageous feature of the invention, different angular ranges can be assigned to different operating functions.

Similarly, according to another advantageous feature of a method of the invention, different angular ranges can be assigned to different operating functions.

For example, increasing rotation angles of the rotary controller in a rotation angle range between 0° and 360° can lead to an increase in the feed rate and increasing rotation angles of the rotary controller in an angular range of between 360° and 720° can lead to a reduction of the feed rates. Thus, by way of rotation of the rotary controller in one and the same direction, different operating functions (increase in the OVR value, reduction in the OVR value) can be performed.

In principle, particular rotation angles of the rotary controller can be assigned to arbitrary OVR values. Thus, characteristic lines with one or more zero crossings in respect of the OVR values can also be realized. In principle, these zero crossings can also lie in the region of positive rotation angles, so that negative OVR values can also be assigned to positive rotation angles.

It is also possible that negative percentage set values can be assigned to particular rotation angle ranges, in particular negative rotation angles, for example, rotation angles in a rotation angle range of between 0° and −360°. Preferably, thereby the rotation direction of the spindle or the movement direction of the tool in these rotation angle ranges and/or at these rotation angles becomes reversed in relation to other rotation angle ranges or other rotation angles.

According to another advantageous feature of a method of the invention, negative percentage set values can be assigned to particular rotation angle ranges, in particular negative rotation angles, wherein in particular the rotation direction of the spindle or the movement direction of the tool in these rotation angle ranges or at these rotation angles becomes reversed in relation to other rotation angle ranges or other rotation angles (to which positive percentage set values are assigned).

According to another advantageous feature of the invention, different operating functions can be assigned to different operating sequences.

Similarly, according to another advantageous feature of a method of the invention, different operating functions can be assigned to different operating actions or operating sequences.

When the user himself can specify which operating function he intends for which operating sequence, a high degree of individualization is achieved in the operation.

In particular, this possibility allows the operator to assign often used operating functions individually to particularly memorable or easily executed operating sequences that are used particularly often. Thus the operability for the individual user can be further improved.

According to another advantageous feature of the invention, operating sequences can be configured individually and/or can be learned.

Similarly, according to another advantageous feature of a method of the invention, operating actions or operating sequences can be configured individually and/or are learned.

This function permits the operator to define his own operating sequences. Thus, operating sequences can be, for example, recorded and learned, which places practically no limits on the individual configuration freedom for the operation by means of a rotary controller.

According to another advantageous feature of the invention, the effect on the feed rate and/or the spindle rotary speed of the operating action can be carried out by means of the rotary controller can be specified dependent upon a function that can be carried out by the machine tool.

Similarly, according to another advantageous feature of a method of the invention, for different functions that can be carried out by the machine tool, different effects on the feed rate and/or the spindle rotary speed of the operating actions carried out by means of the rotary controller are specified.

Among the functions that can be carried out by (or by means of) the machine tool are, in particular, the machining types that can be carried out by the machine tool. Thus, in particular, universal machine tools permit the execution of different machining operations, e.g. turning, milling and drilling, with one and the same machine.

Furthermore—as mentioned in the introduction—distinctions are made between machining functions (machining types) in which the tool is in engagement, and movement functions in which the tool and the workpiece are separated from one another, e.g. rapid feed movements.

The invention provides that for different functions of the machine, different effects (operating functions) of a particular operating action carried out by means of the feed override or the spindle override can be set.

Thus, for example, for the machining type "turning", a different feed override characteristic line can be set and, for this machining type, automatically become effective than, for example, for the machining type "milling". In addition, for the function "rapid feed movement", a different feed override characteristic line can be set and, for this machining type, automatically become effective, than, for example, with a characteristic line for a particular machining type.

In particular, the CNC control system recognizes which machining type is currently being carried out by means of the machine tool in question, for example, on the basis of the currently executed command from the parts program, such as for example a "G0" command for a rapid feed or a milling cycle that has been accessed, and creates the relationship specified for this function between the operating action carried out by the relevant rotary controller and the effect (operating function) achieved therewith. Naturally, such an arrangement is not only possible for different characteristic lines, but in general for the operating actions and/or operating sequences that can be carried out with the respective rotary controller and the operating functions triggered thereby.

The possibility of adapting the effect of the operating actions carried out by means of the rotary controller on different functions of the machine tool enables a yet better adaptation of these operating elements to the respective case of need. Thus, for a particular machining operation carried out by the machine tool, a very flat characteristic line can be specified in the upper and lower feed rate range and for other functions, e.g. a rapid feed movement, for example, a linear characteristic line can be specified.

Also, for example, the operating function "jump by 10%" can be assigned to the operating action "short rapid right rotation" of the feed override during a machining process, and for the same operating action during a rapid feed movement, the function "jump by 20%" can be assigned.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 9 shows a selection menu for different characteristic lines and angular ranges, FIG. 10 shows a selection menu for different operating sequences, FIG. 11 shows method steps in the execution of a method according to the invention.

DETAILED DESCRIPTION OF PREFERRED EMBODIMENTS

Figure 1:
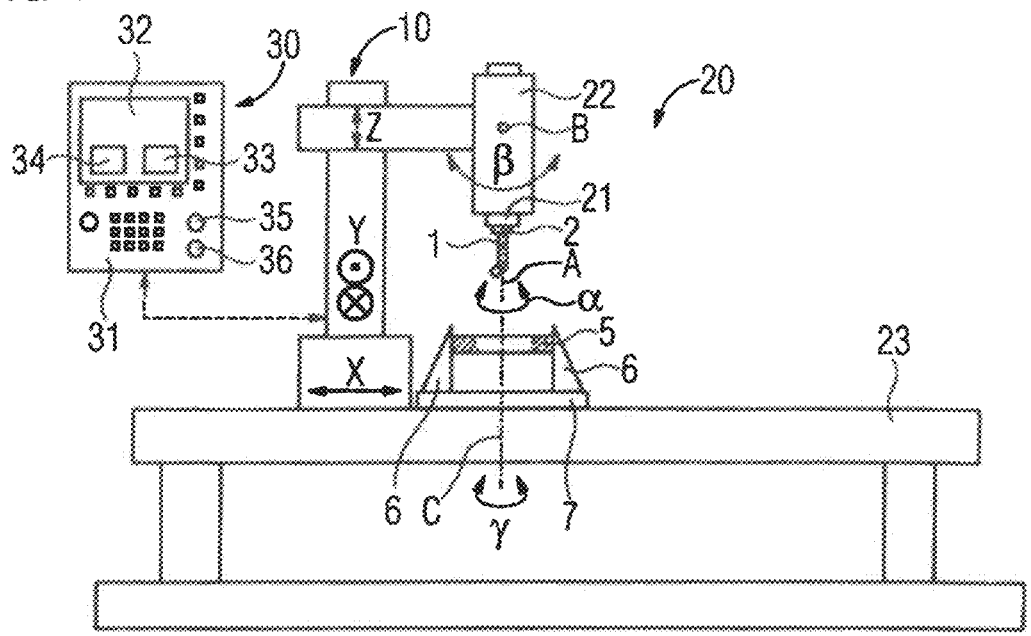
FIG. 1 shows a machine tool system with an operating facility according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a machine tool 20 schematically. In the context of the exemplary embodiment, the machine tool 20 has six machine axes by way of which a relative movement can be carried out between a tool 1, which is present in the exemplary embodiment in the form of a lathe tool 1, and a workpiece 5, in the exemplary embodiment indicated as a valve seat 5. The tool 1 is clamped in a tool holder 2 which is connected to a tool spindle 21 which is driven by a position-controlled motor 22. The workpiece 5 is fastened by clamping means 6 to a workpiece table 7.

With the machine 20 shown in the exemplary embodiment, the lathe tool 1 can be moved translationally in a position-controlled manner with drives (not shown in FIG. 1 for the sake of clarity) in the X, Y and Z-directions. Apart from the three linear axes, the machine tool 20 shown further comprises the two position-controlled rotary axes A and B, also shown in FIG. 1 with which the tool 1 is rotated about the respective axis and can also be oriented in a position-controlled manner through the angular positions $\alpha$ and $\beta$ relative to the workpiece 5.

The machine 20 further has a third position-controlled rotary axis C which extends parallel to the Z-axis and relative to which the workpiece table 7 is rotatably mounted relative to a static machine chassis 23. By this means, the workpiece 5 can also be positioned in an angular position $\gamma$ relative to the tool 1. Here also, for the sake of clarity a representation of the drive has been omitted.

Dependent upon the machining operation that is to be performed, in the machine tool 20 shown, a rotary drive that is speed-regulated in respect of the tool spindle and/or the motor 22 is also possible.

The machine tool 20 according to the exemplary embodiment therefore has six machine axes (the 3 linear axes X, Y and Z and the three rotary axes A, B and C), i.e. it is a so-called 6-axis machine tool (or 6-axis machine) 20.

It should be noted at this point that the machine tool 20 can naturally also have more or even fewer than six machine axes.

The machine tool 20 is connected to a numerical control system (CNC control system) 30 which, on the basis of a parts program carried out by the CNC control system and/or a manual operating input, ascertains position setpoint values x, y, z, $\alpha$, $\beta$ and $\gamma$ for the control of a relative movement taking place between the tool 1 and the workpiece 5. The numerical control system 30 ascertains the position setpoints on the basis of the parts program in which the movement to be carried out by the tool 1 in relation to the workpiece 5 is defined in the form of commands (and position values). Alternatively or additionally, the movement of the tool 1 and/or the workpiece 5 can also be specified by means of a manual operating input via an operating facility 31, which comprises a display apparatus in the form of a display screen 32, to the numerical control system 30 by an operator on site at the machine tool 20. For this purpose, in particular, the operating facility 31 has input fields, buttons and rotary controllers (also known as rotary regulators). In addition, the display apparatus is designed as a graphical user interface, in particular as a touch display screen 32 by means of which—aside from the display function—the operator can also make inputs into the CNC control system and thus, for example, can change the values of particular parameters. For this purpose, the display screen 32 has, in particular, the input fields 33 and 34.

The parts program carried out by the CNC control system is typically generated by an external CAM/CAD system (not shown) and a so-called postprocessor (not shown) possibly connected downstream of the CAM/CAD system outside the numerical control system 30 and from there is transferred to the numerical control system 30.

During the execution of the parts program, the numerical control system 30 generates both position setpoints x, y and z for the linear axes and also $\alpha$, $\beta$ and $\gamma$ (angular positions) for the rotary axes at a particular clock rate, the interpolation clock rate. By way of these position setpoints, the tool 1 is moved along a movement path with a specified orientation and at a particular feed rate relative to the workpiece 5.

Apart from the aforementioned turning machining of the workpiece 5, the 6-axis machine shown can also be used, for example, to carry out a milling operation of the workpiece 5 wherein the tool 1 is designed as a milling tool (not shown) rotating about the spindle axis A, said milling tool being positioned in a position-controlled manner in the X, Y and Z-direction and in which the workpiece 5 is preferably immovably fastened. The drive of the milling tool by the motor 22 and the spindle 21 would therein take place in a speed-regulated manner with a spindle rotary speed specified by the parts program.

Furthermore, FIG. 1 also shows the two rotary controllers 35 and 36, which are described in greater detail below.

Figure 2:
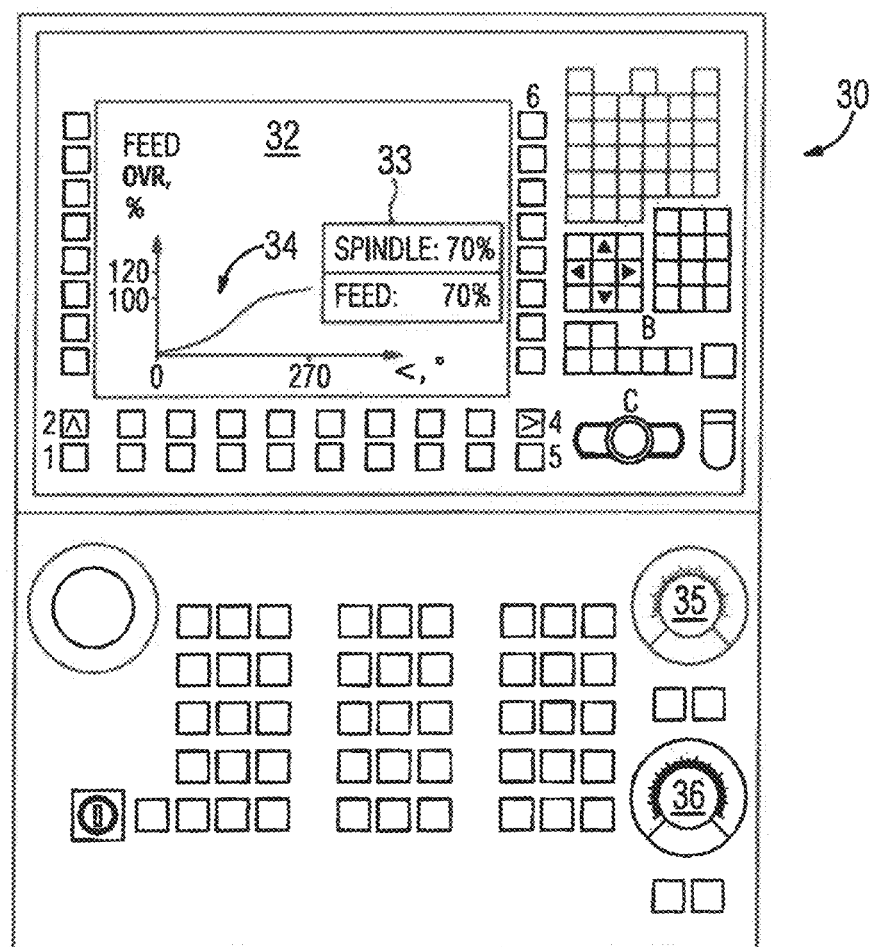
FIG. 2 shows a CNC control system with an operating facility according to the invention.

FIG. 2 shows the CNC control system 30 illustrated purely symbolically in FIG. 1 in greater detail. Apart from a plurality of input buttons, a display apparatus in the form of a display screen 32 on which different content types can be displayed graphically and, in particular, in conjunction with a pointing device (e.g. computer mouse, not shown), input into the CNC control system 30 can be undertaken.

The operating facility of the CNC control system 30 further comprises the rotary controllers 35 and 36, wherein with the rotary controller 35 (designated "SPINDLE override"), the percentage set value (OVR value) for the spindle rotary speed and with the rotary controller 36 (designated "FEED override"), the percentage set value for the feed rate or the rapid feed rate can be set.

In the display region 33 of the display screen 32, the current, percentage set values for the SPINDLE override (70%) and the FEED override (70%) are shown. These settings mean that the current actual values for the spindle rotary speed and the feed rate are each only 70% of their programmed value.

Additionally, in a display screen region 34, the characteristic line is shown, from which, for a particular set rotation angle of the FEED override 36, there results the associated OVR value.

As a result of the flat shape of the characteristic line in the upper and the lower angular range, the OVR value can be particularly finely adjusted in these regions.

Figure 3:
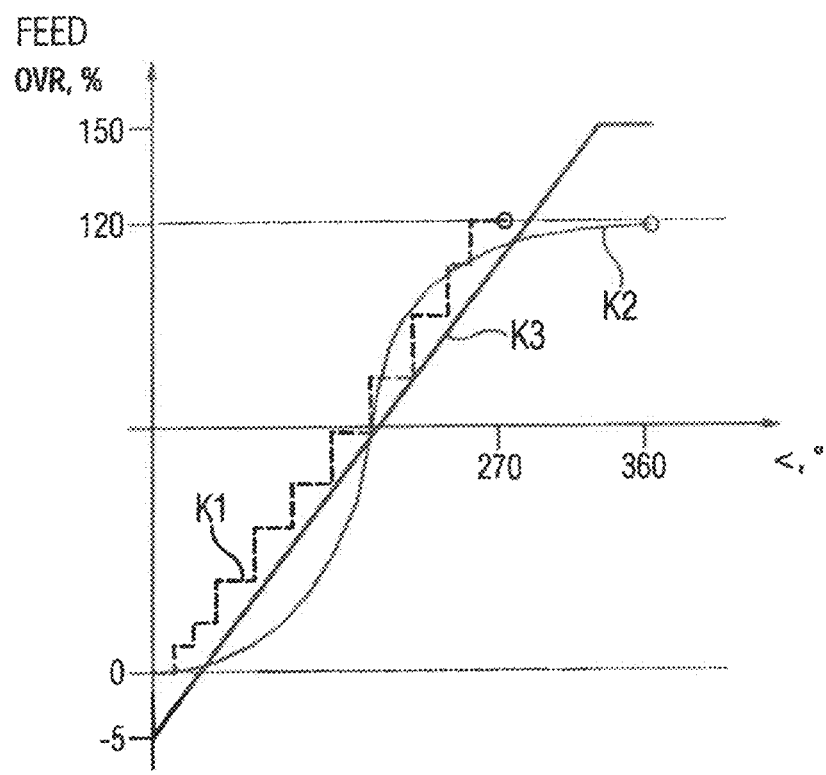
FIG. 3 shows a representation of different characteristic lines for a feed override.
Figure 4:
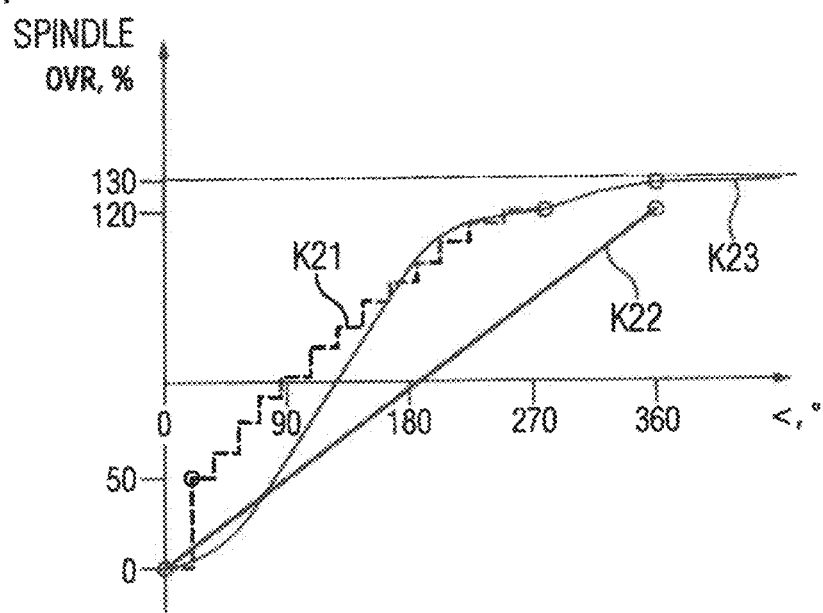
FIG. 4 shows a representation of different characteristic lines for a spindle override.

FIGS. 3 and 4 illustrate the relationship between the respective rotary controller setting (the rotation angle) and the OVR value for a conventional rotary controller as compared with an arrangement according to the invention.

FIG. 3 shows a classic "stepped" characteristic line K1 typically specified by the control system manufacturer for the FEED-OVR and not changeable by the user, with abrupt changes in the FEED-OVR in 23 steps as realized, for example, in conventional rotary controllers with fixed end stops and a maximum rotation angle of 270°.

As distinct therefrom, a "curved", continuous characteristic line K2 is shown which uses, for example 256 or more steps of a digital encoder, whereby for the user, steps or jumps are no longer perceptible, either in the operation of the machine tool or in the graphical representation of the characteristic line, for example, as shown by the characteristic line K2 in FIG. 3.

The characteristic line K2 is flattened in the region of low feeds (low OVR values) and in the region of high feeds (high OVR values). In addition, this characteristic line can optionally have an effective rotation angle range of 6/8 of a rotation (270°) or also higher angular ranges up to 360° or even therebeyond. The OVR values for the characteristic line K2 selected in the example are between 0% and 120%.

Furthermore, shown by way of example in FIG. 3 is a linear characteristic line K3 that can be specified by the user, which uses all the available 256 increments of an exemplary rotary controller in an angular range of the rotation angle (rotation angle range) from 0° to 360°.

Also shown with the example of the characteristic line K3 is the possibility that with the OVR, a negative feed of e.g. −5% can also be set. The possible OVR values for the exemplary characteristic line K3 therefore lie in the range between −5% and 150%.

Similar behavior is shown in the exemplary characteristic lines of FIG. 4.

FIG. 4 shows different characteristic lines for the SPINDLE-OVR which here also give the relationship between the rotation angle of the rotary controller in ° and the SPINDLE-OVR value in % that is set thereby.

The characteristic line K21 shows the "classic" case of a stepped characteristic line with abrupt changes in the feed OVR in 16 steps distributed over a rotation angle range from 0° to 270°.

The characteristic lines K22 and K23 are examples of characteristic lines defined by a user. K22 creates a linear relationship between the rotation angle in a setting range from 0° to 360° and generates SPINDLE-OVR values associated therewith in the range from 0% to 120%. As distinct therefrom, K23 creates an at least substantially (from the viewpoint of the user) smooth, i.e. not abrupt or not stepped, relationship for the rotation angle starting at 0° and extending beyond 360° and a SPINDLE-OVR value associated therewith, in the range from 0% to 150%. The flattened shape in the region of low or high set values enables a finer setting in these regions.

Figure 5:
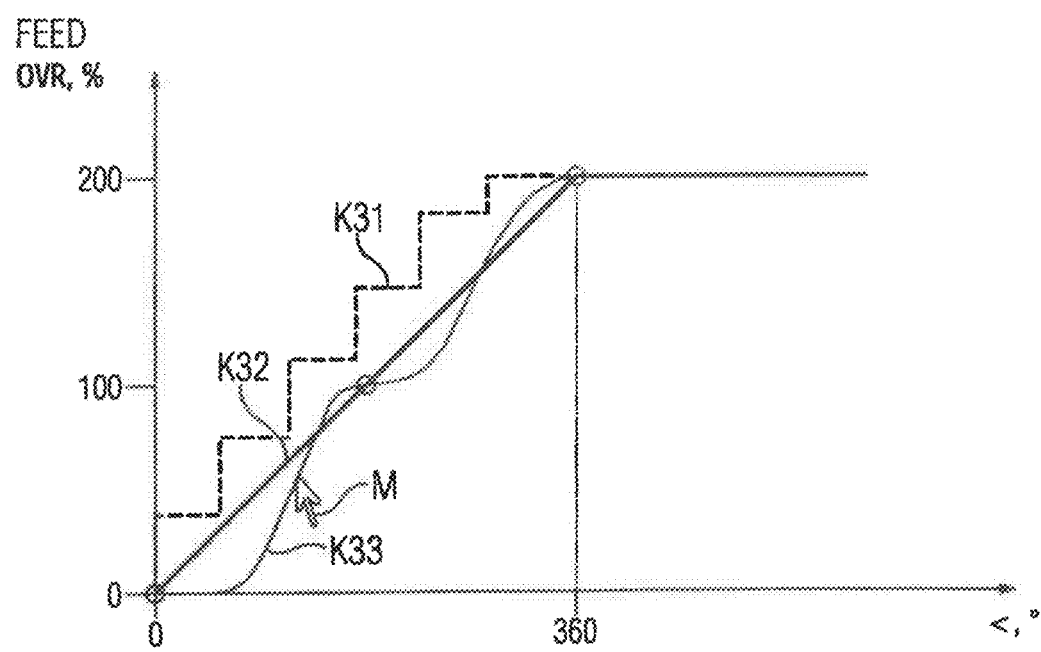
FIG. 5 shows a representation of characteristic lines for a rotary controller angular range>360°.

Overall, the possibility of setting individual characteristic lines offers the following advantages to the user:
  a free definition of the effective rotation angle range e.g. between 0° and ⅞ths of a rotation (270°) or a full rotation (360°);
  a free definition of the effective OVR value range, e.g. between −1% and +150%;
  a free definition of the relationship between the rotation angle and the OVR value and thus of the influencing of the speed or rotary rate;
  the degree of influencing can be refined in a particular region by way of a flat characteristic line (e.g. at 0%);
  the degree of influencing can be coarsened in a particular region by way of a steep characteristic line (e.g. close to 75%);
  in addition, a "stepped behavior" can be set, with which the behavior of long known rotary controllers can be emulated;
  possibility of setting a mixture of a continuous characteristic line and a stepped characteristic line;
  the number of increments (steps) which are used for the non-linear characteristic line can be freely selected;

The following advantages arise therefrom, for example, for the user in the influencing of processes:
  increasing the sensitivity of the speed specification in the low speed region about 0% for feed-OVR;
  increasing the sensitivity of the speed specification in the high speed region about 100% for feed-OVR (fine adjustment for slight modification of the speed to prevent chatter vibrations);
  increasing the sensitivity of the speed specification in the high speed region about 100% for spindle-OVR (fine adjustment for slight modification of the speed to prevent chatter vibrations);

FIG. 5 shows examples for setting the FEED-OVR (feed overrides). Therein, characteristic line K31 shows a stepped shape of the characteristic line in a rotation angle from 0° to 270° and with FEED-OVR values in a range between 0% and 200%.

The characteristic line K32 shows a linear smooth shape for a rotation angle from 0° to 360° and with FEED-OVR values in a range between 0% and 200%.

The characteristic line K33 shows a smooth curved shape for a rotation angle from 0° to 360° with FEED-OVR values in a range between 0% and 200%.

Outside the valid rotation angle range (i.e. for a rotation angle <0° or >360°), the latest valid OVR value is retained.

Figure 6:
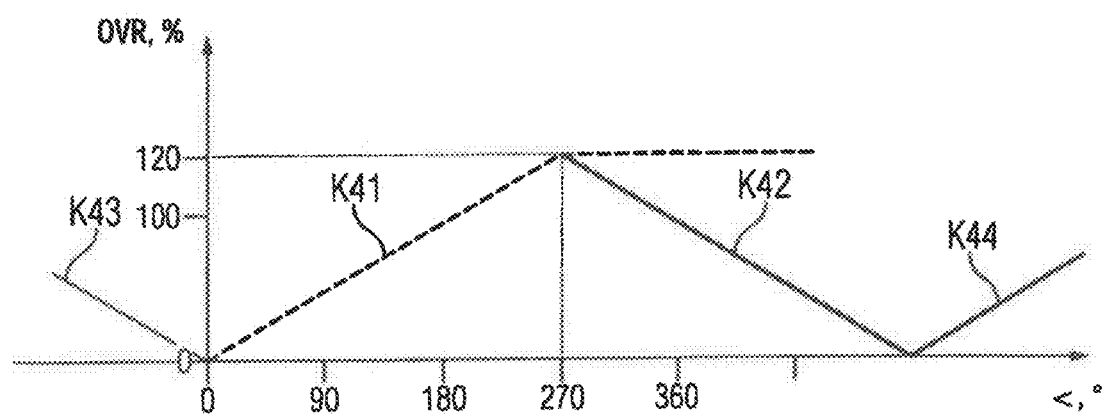
FIG. 6 shows a representation of characteristic lines for a rotary controller angular range>360°.

FIG. 6 shows an exemplary embodiment in which the effective rotation angle range extends to more than one rotation (360°).

In a first rotation angle range from 0° to 270°, there applies a linearly increasing relationship to an OVR value in the range between 0% and 120% (see characteristic line K41). Furthermore, in a second rotation angle range from 270° to 540°, a linearly increasing relationship to an OVR value in the range between 120% and 0% (see characteristic line K42) applies. This change between a rising and a falling characteristic line for value ranges of 270° continues endlessly to the left and the right. Thus a linear falling characteristic line K43 in the range from −270° to 0° results. Other gradients or rotation angle ranges could also be specified for the characteristic lines K42 or K43 than for the characteristic line 41.

Overall, the possibility of setting individual characteristic lines illustrated by way of example in FIGS. 5 and 6 offers the following advantages to the user:
- the last end setting is not "held" as is usual today, but rather further increments are evaluated, e.g. endless zig-zags (see FIG. 6);
- on further rotation of the rotary controller, a further operating function or effect, e.g. a linear decrease of the OVR value adjoins a first operating function or effect, e.g. a linear increase of the OVR value:
  - e.g. on exceeding 120%, a reduction in the OVR value takes place again,
  - e.g. on undershooting 0%, an increase in the OVR takes place again, possibly with a different gradient,
  - if the minimum or maximum OVR value, e.g. 0% or 120% is "passed through", then this value can also be automatically fixed for a particular period in order to make the operator aware of the end value reached since this value can be achieved exactly only with difficulty;
- at the wish of the user, there are no longer any "end positions", for example, if a visibly asymptotic characteristic line K23 from FIG. 4 is selected;
- alternative characteristic lines can be output if the 0% value is undershot or in the event of a negative OVR value and thus a negative feed rate (backward travel) or spindle rotary speed (rotary direction reversal).

The following advantages arise therefrom, for example, for the user in the influencing of processes:
- the resolution for the speed influencing can be increased above the number of rotations of the OVR. This has advantages, for example, for small modifications which the machine operator makes in order to prevent the chatter during milling or turning;
- new possibilities such as "backward trave" through actuation of the override controller.

In order to enable a very fine setting of the current feed rate or the spindle rotary speed, which is needed, for example, for the operator to suppress chatter vibrations efficiently, the invention provides a highly precise variation of precisely the feed or the spindle rotary speed, in particular in that the rotation angle range of the rotary controller that is used exceeds 360° (one rotation).

What is problematic in this variant is that with an adjustment range of, for example, 10 rotations, the operator would not wish to rotate the OVR 10 times completely to progress from a feed of 0% to a feed of 100%. Not least, for this reason, the invention envisages the definition of operating sequences with the aid of which particular operating functions, for example, jumps of particular values can be triggered.

The following preconditions are met in the case of an endlessly rotating OVR according to the invention, so that operating sequences can be defined and used:
- the evaluation of the rotary speed in [increments/unit time] of the OVR;
- the recognition of specified individual rotation patterns which must take place within a stipulated first time period in order to be recognized as such;
- the recognition of a sequence of a plurality of individual rotation patterns which must take place within a stipulated second time period in order to be recognized as such.

Figure 7:
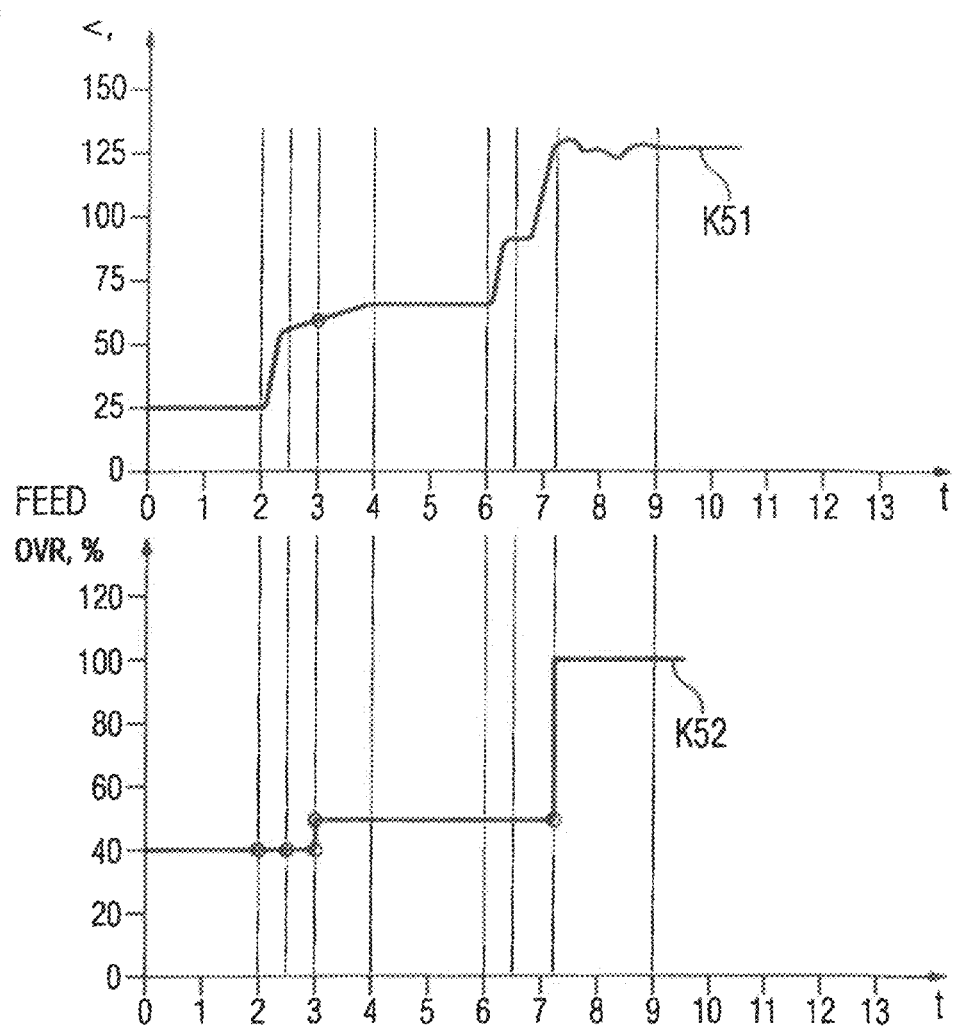
FIG. 7 shows the definition of different operating sequences.

Examples of "individual patterns" and their consequences are:
- by way of a "rapid rotation" in the positive rotation direction with a twisting speed of e.g. >25 inc/s, a predefined "positive OVR jump" of e.g. 10% is recognized and immediately set. Since the OVR can still turn after the immediate setting of the 10% change, the evaluation of the OVR is subsequently suppressed for a definable time period and the OVR is held stable at the setting changed by 10%, see FIG. 7, time range t between 2 s and 4 s.
- by way of a "rapid rotation" in the negative rotation direction with a twisting speed of e.g. >25 inc/s, a predefined "negative OVR jump" of e.g. −10% is recognized and immediately set. Since the OVR can still turn after the immediate setting of the −10% change, the evaluation of the OVR is subsequently suppressed for a definable time period and the OVR is held stable at the setting changed by −10%.

Figure 8:
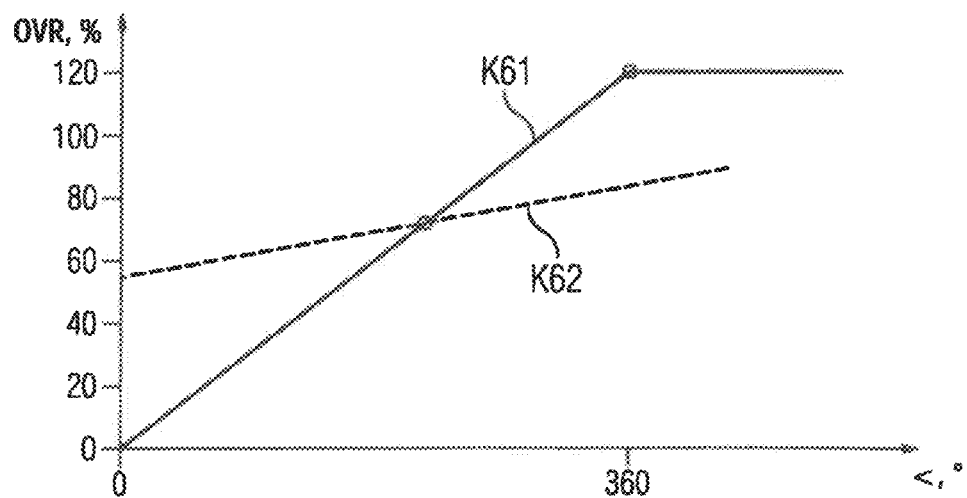
FIG. 8 shows a representation of the effect of different operating sequences.

Examples of a "sequence of individual patterns" and their consequences are:
- by way of a "rapid rotation" in the positive rotation direction performed twice in quick succession with a twisting speed of e.g. >25 inc/s and a pause therebetween of <1 s, a desired predefined "OVR value=100%" is recognized and immediately set. Since the OVR value can still turn after the immediate change to 100%, the evaluation of the OVR is subsequently suppressed for a definable time period and the OVR is held stable at the new setting (100%), see FIG. 7.
- by way of a "rapid rotation" in the negative rotation direction performed twice in quick succession with a twisting speed of e.g. >25 inc/s and a pause therebetween of <1 s, a desired OVR of 0% is recognized and immediately set. Since the OVR can still turn after the immediate change to 0%, the evaluation of the OVR is subsequently suppressed for a definable time period and the OVR is held at the new setting (not shown).
- by way of the predefined "rapid rotation" sequence (operating sequence) in the positive direction and a "rapid rotation" in the negative direction (within a particular time period), for example, the predefined operating function "switch-over of the fineness of the OVR characteristic line by the factor 10" associated therewith can be achieved; see FIG. 8. The characteristic line K61 represents the association before the switch-over ("normal" characteristic line), the characteristic line K62 represents the state after the switch-over, wherein the characteristic line K62 has ¹/₁₀ of the gradient of the characteristic line K61.

the automatic switch-over to a finer OVR characteristic line is also always possible when a new OVR is achieved statically. A switching back to the original characteristic line can then be achieved—also automatically—by means of a rapid rotation procedure, for example. The fine characteristic line comes into effect when the machine operator rotates the OVR controller slowly for fine adjustment, that is for example, <10 increments/s.

by way of further similar sequences such as, for example, "rapid rotation" in the positive direction and subsequent "rapid rotation" in the negative direction, immediately followed by "rapid rotation" again in the positive direction, further arbitrary OVR settings and characteristics can be set.

similarly, arbitrary further operating functions are possible—aside from those shown by way of example—which can be assigned to particular operating actions (operating sequences).

In total, the possibility of the definition of operating sequences and their assignment to particular operating functions offer the following advantages to the user:

if not only the increments completed are evaluated, but also the turning speed (completed increments per time unit) and the sequence of patterns, the OVR controller offers possibilities for extended operating actions;

for example, the OVR can be evaluated over 10 rotations and the operator can nevertheless rapidly reach a 0% or a 100% setting (or any other predefined OVR values) in the simplest manner and possibly the intermediate positions in 10% (or any other predefined) steps;

a simple switch-over of the sensitivity of the OVR characteristic line from "coarse" to "fine" and back or generally, a rapid switch-over between different characteristic lines is possible.

The following advantages arise therefrom, for example, for the user in the influencing of processes:

increasing the sensitivity of the speed specification in the whole speed range between 0% and an upper limit, e.g. 120% during feed override;

increasing the sensitivity of the speed specification in the whole speed region with spindle override (fine adjustment for slight modification of the speed to prevent chatter vibrations).

According to the invention, there is the possibility that an operator can individually configure the behavior of his endlessly rotating OVR controller, in particular via the HMI of the control system. This includes, for example:

selecting one of a plurality of functions that can be executed by means of the machine tool, for which the settings set out as follows should apply. For this purpose, in each of the exemplary embodiments according to FIGS. 9 and 10, it is possible to fulfil this selection by marking the check boxes "G0" (for a rapid feed command) or "Gn" (for all non-rapid feed commands) or to enter a number in each of the fields "G☐", which specifies the specific G-command for which the following settings should apply;

selecting one of a plurality of specified characteristic lines of the OVR controller via a list in the operating region of the HMI 40 (see FIG. 9). Therein, in the exemplary embodiment according to FIG. 9, the operator can select between the characteristic line forms "linear", "curved" or "stepped" by marking the respective check box. Following the corresponding selection, if appropriate, the operator reaches a submenu (not shown) in which details of the selected characteristic line shape (gradient, parameters of a mathematical term, step count and height) can be set;

redefining an individual characteristic line of the OVR controller in the operating region of the HMI;

selecting the individual rotation angle range that is to be evaluated of the OVR via a predetermined list in the operating region of the HMI (see FIG. 9). Therein, in the exemplary embodiment, by selecting the corresponding check box, the operator can select between the effective rotation angle ranges "V° to 270°", "0° to 360°" and "0° to 720°";

inputting a rotation angle range that is to be evaluated individually of the OVR via the operating region of the HMI;

assigning predefined operating actions (operating sequences) to predefined operating functions (effects) of each operating action. Therein, in the exemplary embodiment according to FIG. 10, the operator can select on a visible screen template 41 of the HMI by marking the relevant check box whether the operating sequence "rapid rotation left" triggers a jump in the OVR value by 10%, 20% or −10%, whether the operating sequence "2× rapid rotation right", triggers a jump of the OVR value to the value 50% or 100% or whether the operating sequence "right-left-right" triggers a "switching over to the characteristic line 1" or a "switching over to the characteristic line 2";

free assignment of push buttons and operating functions via the HMI (with adaptation of the function designation in the touch button).

FIG. 11 shows, by way of example, method steps 1 to 6 in the execution of a method according to the invention:

In a first method step S1, by means of an HMI user interface of a CNC control system connected to a machine tool, the effect of the feed override, that is the change in the OVR value is set dependent upon the rotation angle of a FEED-OVR rotary controller (FEED-OVR), on the basis of a characteristic line specifiable by the operator and/or on the basis of an operating sequence specifiable by the operator.

It is therein possible, in particular, to assign different functions of the machine tool (turning, milling, drilling, rapid feed movement, etc.) to different characteristic lines or different operating sequences.

In a second method step S2, by means of the HMI user interface, the effect of the spindle override, that is the change in the OVR value is set dependent upon the rotation angle of a SPINDLE-OVR rotary controller (SPINDLE-OVR), on the basis of a characteristic line specifiable by the operator and/or on the basis of at least one operating sequence specifiable by the operator.

Herein also it is possible, in particular, to assign different characteristic lines or different operating sequences to different functions of the machine tool (turning, milling, drilling, rapid feed movement, etc.).

In a third method step S3, a parts program for machining a workpiece by means of the machine tool is accessed and started on the CNC control system.

In a fourth method step S4, the feed override is set by way of manual actuation of the FEED-OVR by the user according to the characteristic line or the operating sequence specified in method step S1 and dependent upon the function currently executed by the machine tool.

In a fifth method step S5, the spindle override is set by way of manual actuation of the SPINDLE-OVR by the user according to the characteristic line or the operating sequence specified in method step S2 and dependent upon the function currently being executed by the machine tool.

In a method step S6, a function of the machine tool, in particular a machining operation of the workpiece by the machine tool is carried out dependent upon the feed override as set and the spindle override as set.

It should be noted by way of precaution that the method steps S1 to S6 mentioned by way of example in a method according to the invention must not necessarily all be carried out, nor in the sequence given.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An operating facility for a CNC control system for controlling a machine tool which comprises a plurality of machine axes configured to displace or rotate a tool inserted into a tool receptacle of a tool spindle relative to a workpiece, the operating facility comprising:
    at least one endlessly rotatable rotary controller manually operated by an operator of the operating facility by rotating a rotary knob of the at least one endlessly rotatable rotary controller and which is configured to have the operator manually set a feed rate with which the tool is moved relative to the workpiece or a rotary speed of the tool spindle; and
    a graphical user interface configured to set an effect of an operating action on the feed rate or the spindle rotary speed carried out by the operator using the at least one endlessly rotatable rotary controller, wherein actuation of the at least one endlessly rotatable rotary controller sets a rotary angle of the rotary knob, and wherein for the setting the effect of the operating action, a relationship between a rotation angle and a percentage set value is specified by a characteristic line, with the percentage set value determining a relationship between a programmed feed rate or a programmed spindle rotary speed and an actual feed rate or an actual spindle rotary speed, wherein the operator selects in a selection menu of the graphical user interface one characteristic line from a number of characteristic lines, with the selected characteristic line determining the relationship between the rotation angle and the percentage set value.

2. The operating facility of claim 1, wherein a predetermined operating function specifying a relationship between the operating function and the percentage set value is executed by at least one predetermined operating action.

3. The operating facility of claim 2, wherein the at least one predetermined operating action is an operating sequence.

4. The operating facility of claim 2, wherein different operating actions or operating sequences are assigned to different operating functions.

5. The operating facility of claim 4, wherein the different operating actions or operating sequences are individually configured or learned.

6. The operating facility of claim 1, wherein the selected characteristic line is configured using graphical aids.

7. The operating facility of claim 1, wherein the characteristic line has an at least partially smooth or an at least partially stepped shape, or both.

8. The operating facility of claim 1, wherein the characteristic line covers a rotation angle range of greater than 360° or a negative rotation angle.

9. The operating facility of claim 1, wherein different rotation angle ranges are assigned to different operating functions.

10. The operating facility of claim 1, wherein negative percentage set values are assigned to negative rotation angles, with a rotation direction of the tool spindle or a movement direction of the tool becoming reversed in relation to non-negative rotation angle ranges.

11. The operating facility of claim 1, wherein the effect of the operating action carried out by the at least one endlessly rotatable rotary controller on the feed rate or the spindle rotary speed is specified dependent upon a function executed by the machine tool.

12. A method for operating a machine tool, which comprises a plurality of machine axes configured to displace or rotate a tool inserted into a tool receptacle of a tool spindle relative to a workpiece controlled by a CNC control system and which further comprises an operating facility, the method comprising:
    manually operating by an operator of the operating facility at least one endlessly rotatable rotary controller configured to be manually set by the operator by rotating a rotary knob of the at least one endlessly rotatable rotary controller a feed rate with which the tool is moved relative to the workpiece and/or a spindle rotary speed;
    setting on a graphical user interface of the operating facility an effect of an operating action on the feed rate or the spindle rotary speed carried out by the operator using the at least one endlessly rotatable rotary controller, wherein actuation of the at least one endlessly rotatable rotary controller sets a rotary angle of the rotary knob, and wherein for the setting the effect of the operating action, a relationship between a rotation angle and a percentage set value is specified by a characteristic line, with the percentage set value determining a relationship between a programmed feed rate or a programmed spindle rotary speed and an actual feed rate or an actual spindle rotary speed, wherein the operator selects in a selection menu of the graphical user interface one characteristic line from a number of characteristic lines, with the selected characteristic line determining the relationship between the rotation angle and the percentage set value;
    starting on the CNC control system a program specifying the movement of the tool relative to the workpiece; and
    changing the feed rate or the spindle rotary speed according to the operating action.

13. A CNC control system for controlling a machine tool which comprises a plurality of machine axes configured to displace or rotate a tool inserted into a tool receptacle of a tool spindle relative to a workpiece, the CNC control system comprising an operating facility comprising:
  at least one endlessly rotatable rotary controller manually operated by an operator of the operating facility by rotating a rotary knob of the at least one endlessly rotatable rotary controller and which is configured to be manually set by the operator a feed rate with which the tool is moved relative to the workpiece or a rotary speed of the tool spindle, and
  a graphical user interface configured to set an effect of an operating action on the feed rate or the spindle rotary speed carried out by the operator using the at least one endlessly rotatable rotary controller, wherein actuation of the at least one endlessly rotatable rotary controller sets a rotary angle of the rotary knob, and wherein for the setting the effect of the operating action, a relationship between a rotation angle and a percentage set value is specified by a characteristic line, with the percentage set value determining a relationship between a programmed feed rate or a programmed spindle rotary speed and an actual feed rate or an actual spindle rotary speed, wherein the operator selects in a selection menu of the graphical user interface one characteristic line from a number of characteristic lines, with the selected characteristic line determining the relationship between the rotation angle and the percentage set value.

* * * * *